Dec. 2, 1958     A. W. GARDINER     2,862,654
VARIABLE PITCH GUIDE VANES
Filed Dec. 16, 1954     3 Sheets-Sheet 2
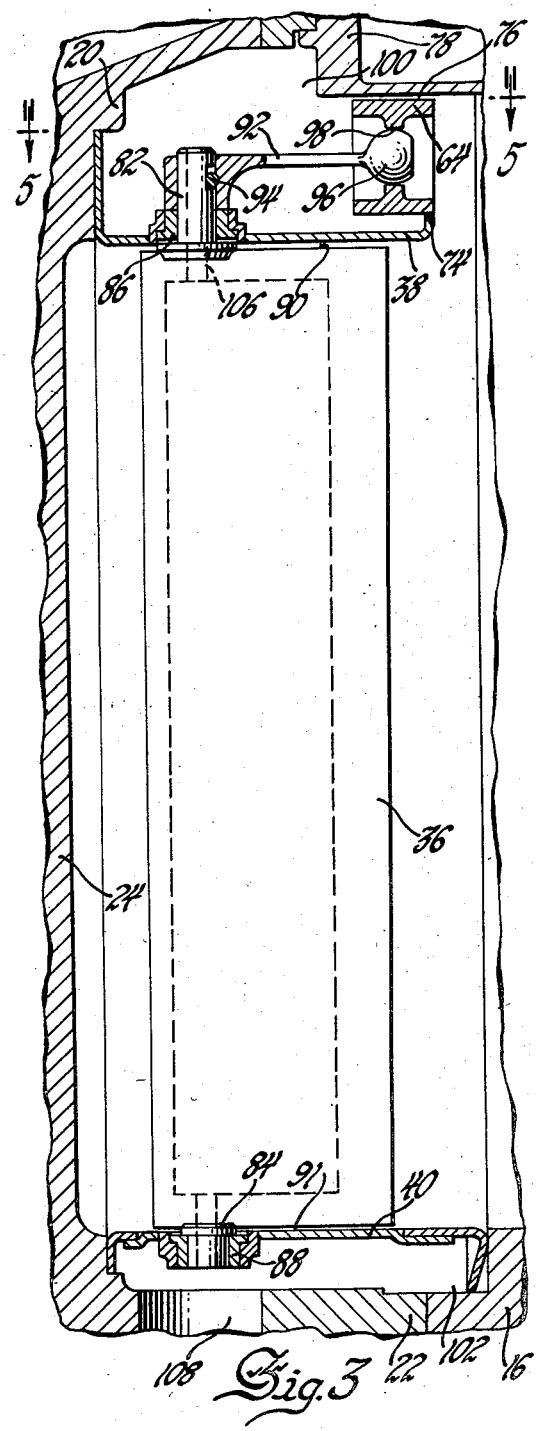
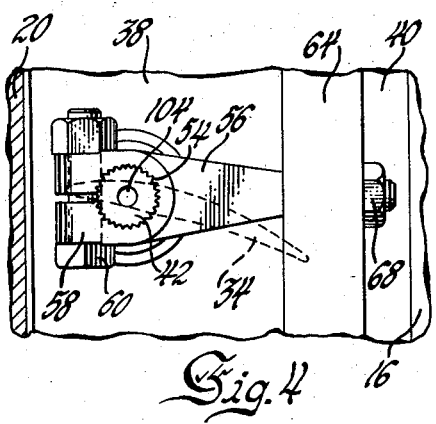
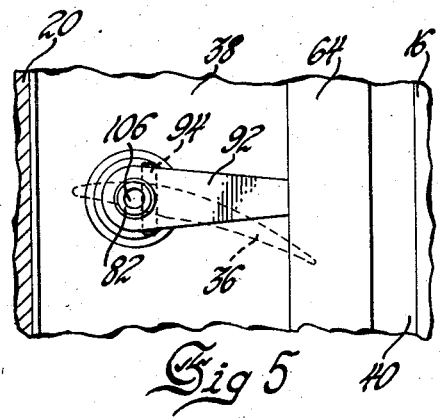
INVENTOR
Arthur W. Gardiner
BY
Paul Fitzpatrick
ATTORNEY

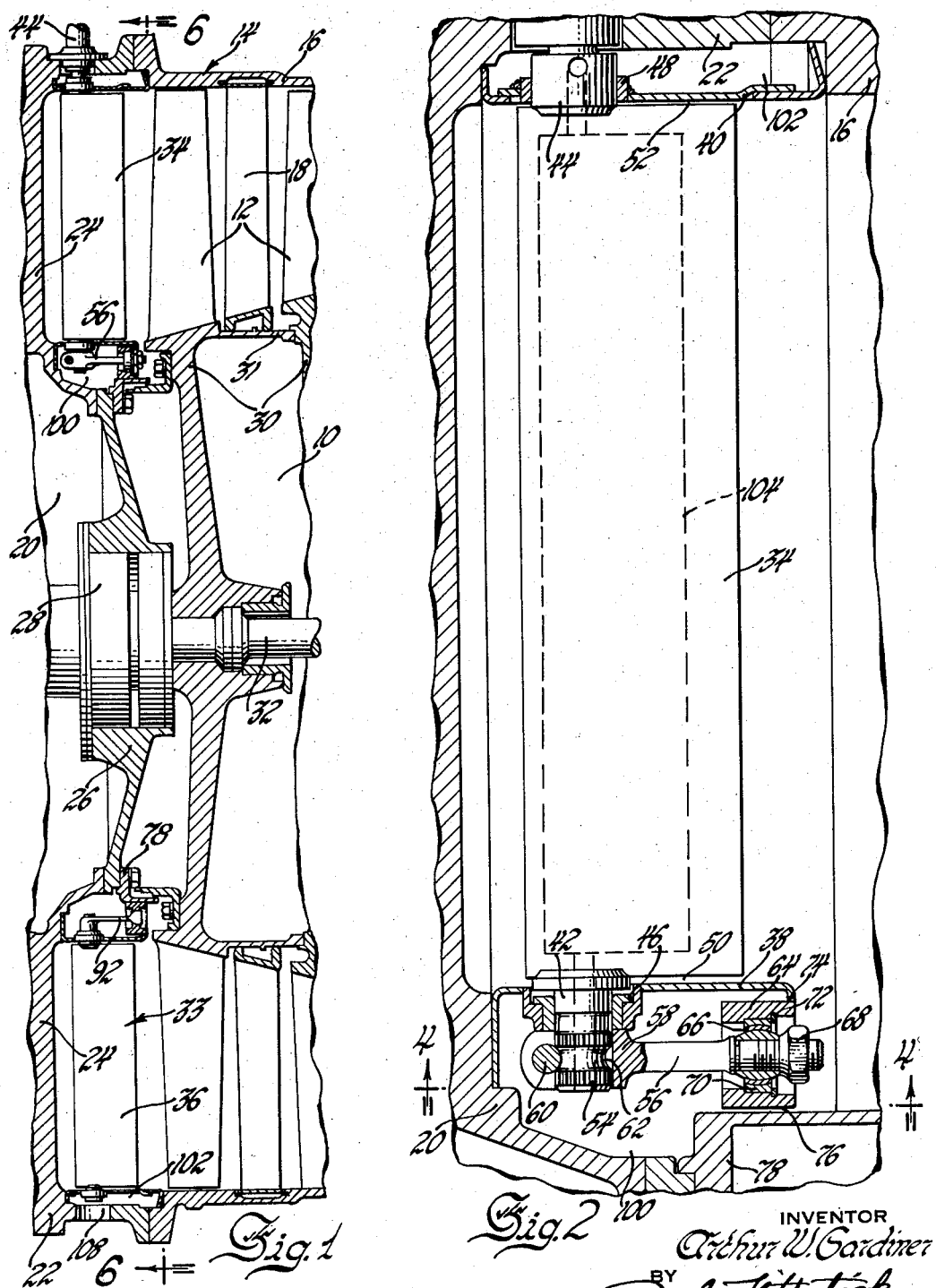

United States Patent Office 2,862,654
Patented Dec. 2, 1958

2,862,654

VARIABLE PITCH GUIDE VANES

Arthur W. Gardiner, Indianapolis, Ind., assignor to General Motors Corporation, Detroit, Mich., a corporation of Delaware Application December 16, 1954, Serial No. 475,749

2 Claims. (Cl. 230—114)

This invention relates to aircraft engines and more particularly to a variable pitch inlet guide vane assembly for a gas turbine axial flow compressor.

The inlet guide vanes of most axial flow compressors are fixed despite the recognition by designers of the desirability of providing axial flow compressors with variable pitch inlet guide vanes to eliminate stall conditions that occur during starting and low speed operation of the compressor. A major reason for the non-adaptation of variable pitch guide vanes resides in the difficulty of providing a suitable variable pitch guide vane mechanism that will meet aircraft space and weight requirements and that can be incorporated into existing compressor designs without radical alterations.

An object of the invention is to provide an axial flow compressor of the type generally used in aircraft gas turbines with an improved variable pitch inlet guide vane arrangement.

Further objects and advantages of the present invention will be apparent from the following description, reference being had to the accompanying drawings, wherein a preferred form of the present invention is clearly shown.

In the drawings:

Figure 1 is a partial axial section through the compressor portion of an aircraft gas turbine;

Figure 2 is an enlarged partial axial section corresponding to the upper portion of Figure 1 and taken substantially on the plane indicated by the line 2—2 of Figure 6;

Figure 3 is an enlarged partial axial section corresponding to the lower portion of Figure 1 and taken substantially along the plane indicated by the line 3—3 of Figure 6;

Figure 4 is a partial horizontal section taken substantially along the plane indicated by the line 4—4 of Figure 2;

Figure 5 is a partial horizontal section taken substantially along the plane indicated by the line 5—5 of Figure 3.

Figure 6:
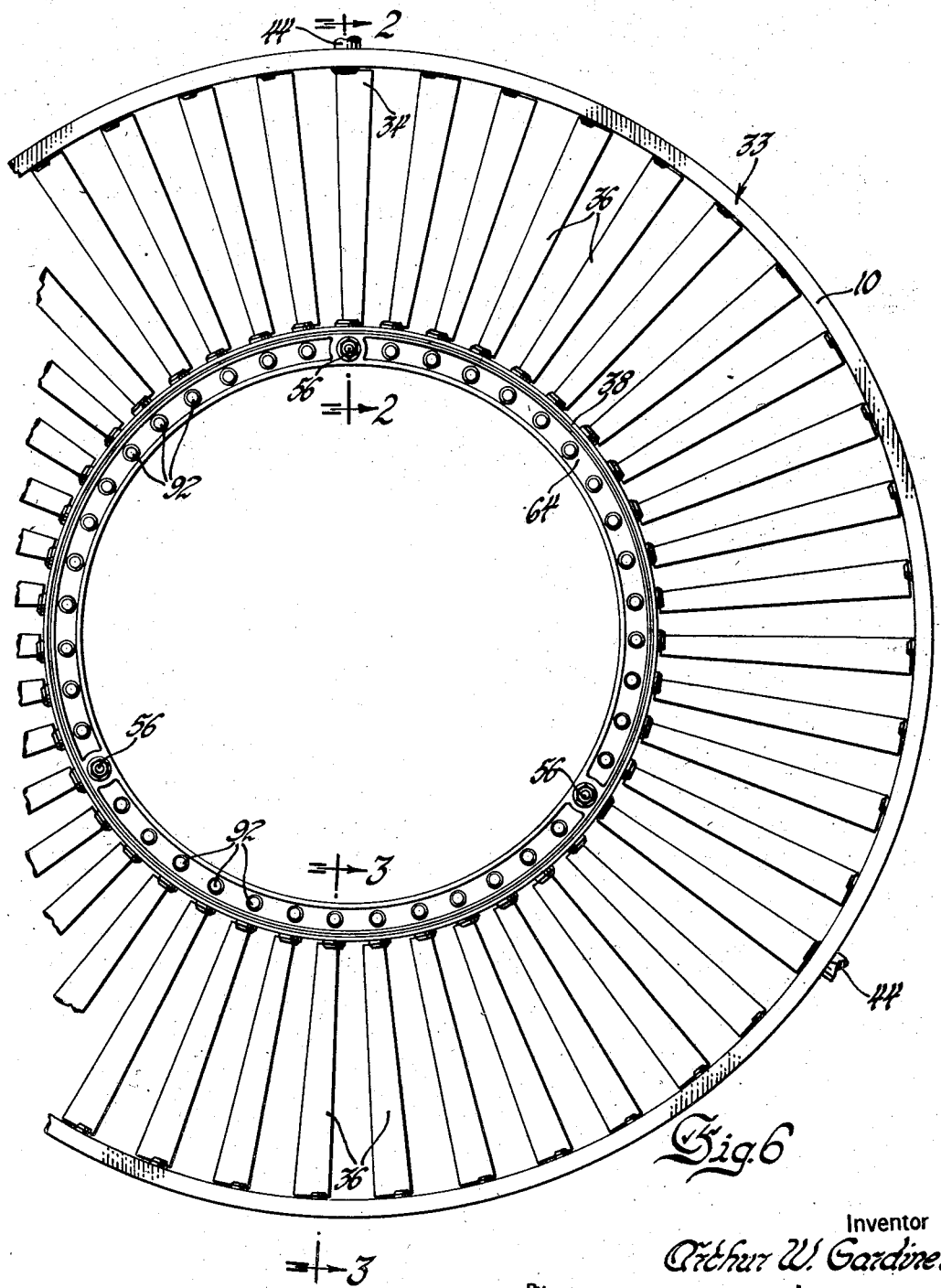
Figure 6 is a partial section transverse to the compressor axis taken substantially along the plane indicated by the line 6—6 of Figure 1.

Referring now to the drawings and more particularly to Figures 1 and 6, the axial flow compressor includes a known drum type rotor 10 carrying a plurality of annular blade rows 12 and suitably supported for rotation by the gas turbine engine housing 14. The forward portion of the housing 14 comprises a circular compressor casing 16 carrying a plurality of annular stator vane rows 18 in interposed relation with the rotor blade rows 12. The compressor casing 16 supports an annular inlet guide vane housing that includes circular inner and outer walls 20 and 22 joined together by a plurality of circumferentially spaced radial struts 24. A disk-like bearing housing 26 secured to the inner wall 20 mounts an antifriction bearing 28 to provide rotational support for the forward end of the compressor rotor 10. The drum type rotor comprises a plurality of disks 30 splined together by peripheral flanges 31 and maintained in assembled relation by an axial tie bolt 32.

The structure thus far described is well known to those skilled in the art and for this reason the drawings have been restricted to show a minimum of compressor detail. The rearward portion of the compressor rotor (not shown) is supported for rotation in a manner similar to the forward portion by the usual diffuser housing (not shown). Reference may be had to any number of patents on axial flow compressors by those not skilled in the art for complete drawings thereof; and in particular to application Serial Number 228,159, Variable Compressor Vanes, filed May 25, 1951 in the name of Richard H. Campbell. The forenoted application discloses a variable pitch inlet guide vane arrangement for an axial flow compressor that precedes the present improved variable pitch inlet guide vane arrangement.

The compressor inlet housing provides support for the variable pitch inlet guide vane assembly 33 which includes three master vanes 34 spaced at 120° intervals and forty-two intermediate slave vanes 36 at 8° intervals. The guide vanes 34 and 36 extend radially between inner and outer shroud rings 38 and 40 which mount the guide vane assembly 33 in the inner and outer walls 20 and 22 of the inlet housing. The master vanes 34 carry radial pins or shafts 42 and 44 at their inner and outer ends that journal for axial movement and rotation in inner and outer shroud bushings 46 and 48. A small amount of radial clearance is provided at 50 and 52 between the inner and outer ends of the master guide vanes 34 and the inner and outer shrouds 38 and 40 so that the master vanes can shift slightly along their axis of rotation. This clearance plays an important role in the invention as will be described. The master guide vane shafts 44 extend through the outer wall 22 of the inlet guide vane housing so that a rotational effort may be applied to them in any suitable manner, for example, by the lever and ring drive of the aforenoted application Serial Number 228,159.

The inner shafts 42 project through the inner shroud 38 and are externally splined at 54 to receive internally splined levers 56. The levers 56 have a U-shaped end 58, as best seen in Figure 4, and bolts 60 clamp the levers and shafts 42 together. The bolts 60 engage annular grooves 62 in the shafts to fix the levers on the shafts for axial movement therewith and the splines at 54 fix the levers on the shafts for turning movement therewith. A driving ring 64 is mounted on the rearward ends of the levers by spherically surfaced balls 66 retained on the levers by nuts 68 and received in spherically surfaced sockets 70 retained in the ring by snap rings 72. The master vanes 34 and the slave vanes 36 provide the sole support for the drive ring 64 and suitable radial clearance is provided at 74 and 76 between the inner shroud 38 and the stationary seal 78 to insure freedom of the drive ring. The master vanes 34 receive turning effort through the outer shafts 44 and transmit the same through the inner shafts 42 and levers 56 to the drive ring 64 which then transmits the turning effort to the slave vanes 36 through means to be described. The axis of rotation of the drive ring 64 is determined by the intersection of the axes of rotation of the master vanes 34 and the guide vane assembly 33 is fabricated so that this intersection will be located at a common point on the axis of the compressor rotor. It should be understood that this means of support in conjunction with the radial clearances at 74 and 76 eliminates the possibility of the drive ring binding on fixed members of the inlet housing such as the air seal member 78. The drawings illustrate the variable pitch apparatus in what may be termed a neutral position, that is, a position where the master vane levers 56 and the slave vane levers 92, to be described, are at their outer-most radial position with respect to the inner shroud 38 and are parallel to the rotor axis. Rotation of the master vanes 34 in either direction from the neutral position will vary the angle of incidence of the master and associated slave vanes with respect to the air stream through the compressor inlet. The master vanes 34 will shift radially inward during such rotation as the ball and socket end connections of the levers 56 have to follow the rotational movement of the drive ring 64 about the rotor axis and the levers 56 will shift and drive ring 64 forwardly along its axis of rotation during such rotation. The clearance spaces 50 and 52 between the inner and outer ends of the master vanes 34 and the inner and outer shrouds 38 and 40 allow radial shifting of the vanes and the clearance spaces 74 and 76 between the drive ring 64 and the inner shroud 38 and seal 78 allow axial shifting of the drive ring. These clearances are approximately $\frac{1}{32}$ of an inch as but slight rotation of the vanes is required in the particular guide vane assembly.

The slave vanes 36, best seen by reference to Figures 3 and 5, are disposed in the vane assembly 33 similarly to the master vanes 34. The slave vanes 36 carry radially extending pins or shafts 82 and 84 at their inner and outer ends that journal for rotation in inner and outer shroud bushings 86 and 88. Radial clearance is provided at 90 and 91 between the inner and outer ends of the slave vanes and the inner and outer shrouds 38 and 40 so that the vanes can shift radially of the rotor axis. The inner shafts 82 project through the inner shroud 38 to receive levers 92 which are secured for rotation by taper pins 94. Spherically surfaced balls 96 on the ends of the levers 92 engage in cylindrical sockets 98 in the drive ring 64 so that the slave vanes receive turning effort from the drive ring. The fit between the slave levers 92 and the drive ring 64 is a loose fit as compared to the fit between the master levers 56 and the drive ring and only the master levers prevent axial movement of the drive ring.

The invention simplifies the machining and assembly of the compressor as the variable pitch guide vane assembly is essentially independent of the compressor and inlet housing assembly relying thereon only for support through the inner and outer shroud rings 38 and 40. The shrouds 38 and 40 form annular chambers 100 and 102 with the inlet housing and the guide vanes have axial passages 104 and 106 so that hot air for deicing may be transmitted through them. A passage 108 in the inlet housing serves to introduce the deicing air into the chamber 102 and the air exhausts past clearance spaces around the drive ring 64 from the chamber 100 after passing through the passages 104 and 106 of the guide vanes and shafts.

While the preferred embodiment of the invention has been described fully in order to explain the principles of the invention, it is to be understood that modifications of structure may be made by the exercise of skill in the art within the scope of the invention which is not to be regarded as limited by the detailed description of the preferred embodiment.

I claim:

1. In an axial flow compressor, an annular air inlet housing, a stator casing, a rotor mounted for rotation within the casing, and a variable pitch inlet guide vane assembly in the housing comprising spaced coaxial inner and outer shroud rings mounting the assembly in the housing, an annular row of radially extending guide vanes located between the shroud rings with radial clearance for rotational and radial shifting movement, the guide vanes being more than three in number and having radially extending coaxial inner and outer shafts slidably journaled in radially extending bores in the shroud rings, a selected few of the guide vanes having their outer shafts extending through the stator casing whereby rotational effort may be applied thereto, a drive ring for transferring the rotational effort from the selected guide vanes to the remaining guide vanes and spaced within the inner shroud ring in coaxial relation and located to one side of the inner shafts of the guide vanes, the drive ring and housing having sufficient clearance between them so that the drive ring is entirely free of direct support from the housing, and levers having one end fixed on the inner shafts of the guide vanes and having ball and socket connections at the other end to support the drive ring for rotational and axial shifting movement with rotational movement of the guide vanes.

2. In an axial flow compressor, an annular air inlet housing, a stator casing, a rotor mounted for rotation within the casing, and a variable pitch inlet guide vane assembly in the housing comprising spaced coaxial inner and outer shroud rings mounting the assembly in the housing, an annular row of radially extending guide vanes located between the shroud rings with radial clearance for rotational and radial shifting movement, the guide vanes being more than three in number and having radially extending coaxial inner and outer shafts slidably journaled in radially extending bores in the shroud rings, a selected few of the guide vanes having their outer shafts extending through the stator casing whereby rotational effort may be applied thereto, a drive ring for transferring the rotational effort from the selected guide vanes to the remaining guide vanes and spaced within the inner shroud ring in coaxial relation and located to one side of the inner shafts of the guide vanes, the drive ring and housing having sufficient clearance between them so that the drive ring is entirely free of direct support from the housing, and levers having one end fixed on the inner shafts of the guide vanes and having ball and socket connections at the other end to support the drive ring for rotational and axial shifting movement with rotational movement of the guide vanes, the ball and socket connections of the selected guide vanes having complementary spherical surfaces to hold the drive ring from sliding off of the levers.

References Cited in the file of this patent
UNITED STATES PATENTS 2,473,329    Candler _____ June 14, 1949

FOREIGN PATENTS 500,965    Great Britain _____ Feb. 20, 1939